Feb. 9, 1960 C. C. MOORE 2,924,344
HARVESTING WAGON
Filed Feb. 12, 1957 4 Sheets-Sheet 2
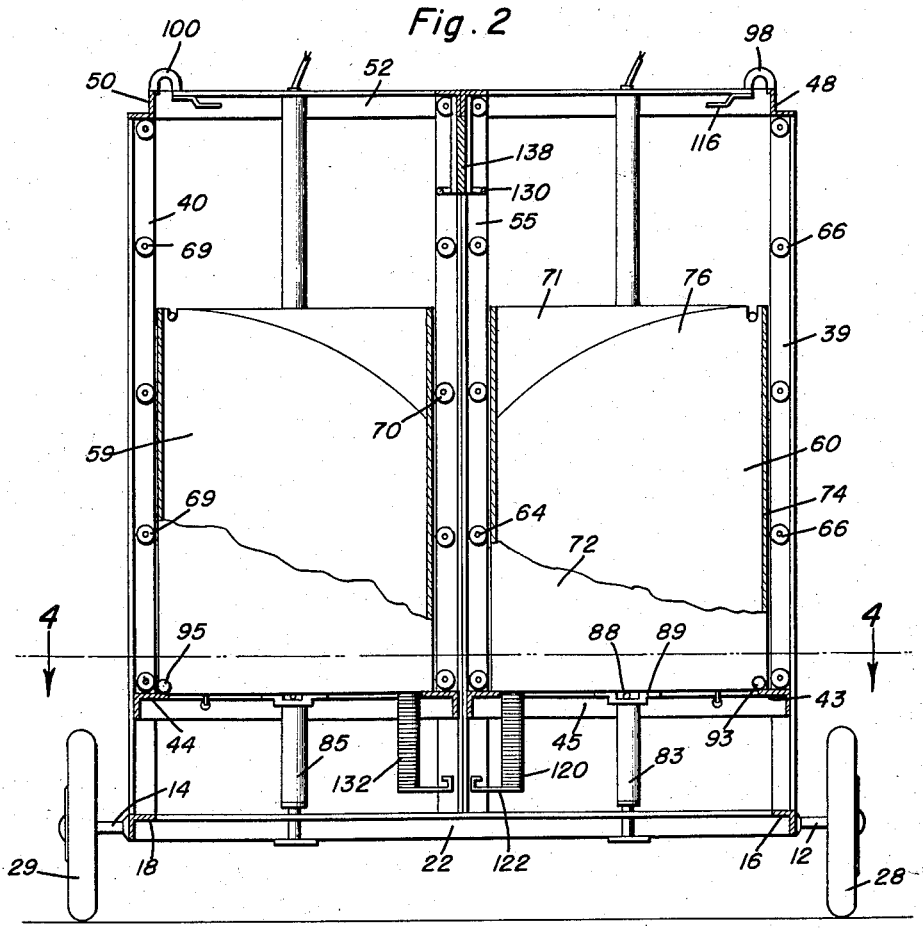
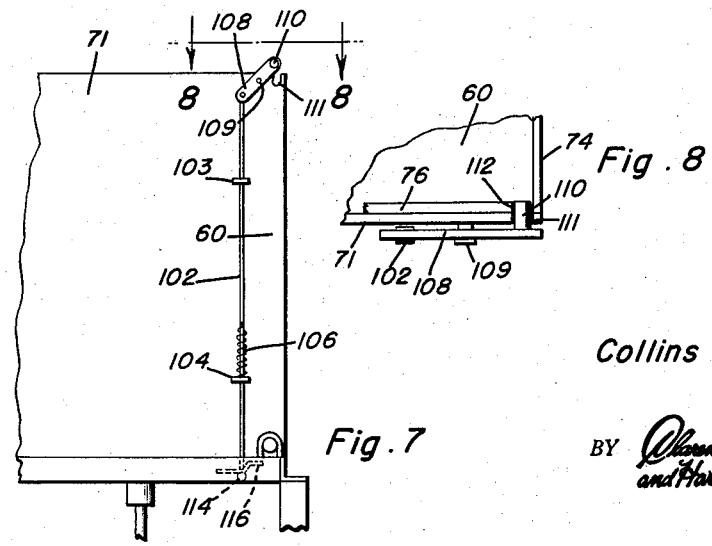
Collins C. Moore
INVENTOR.

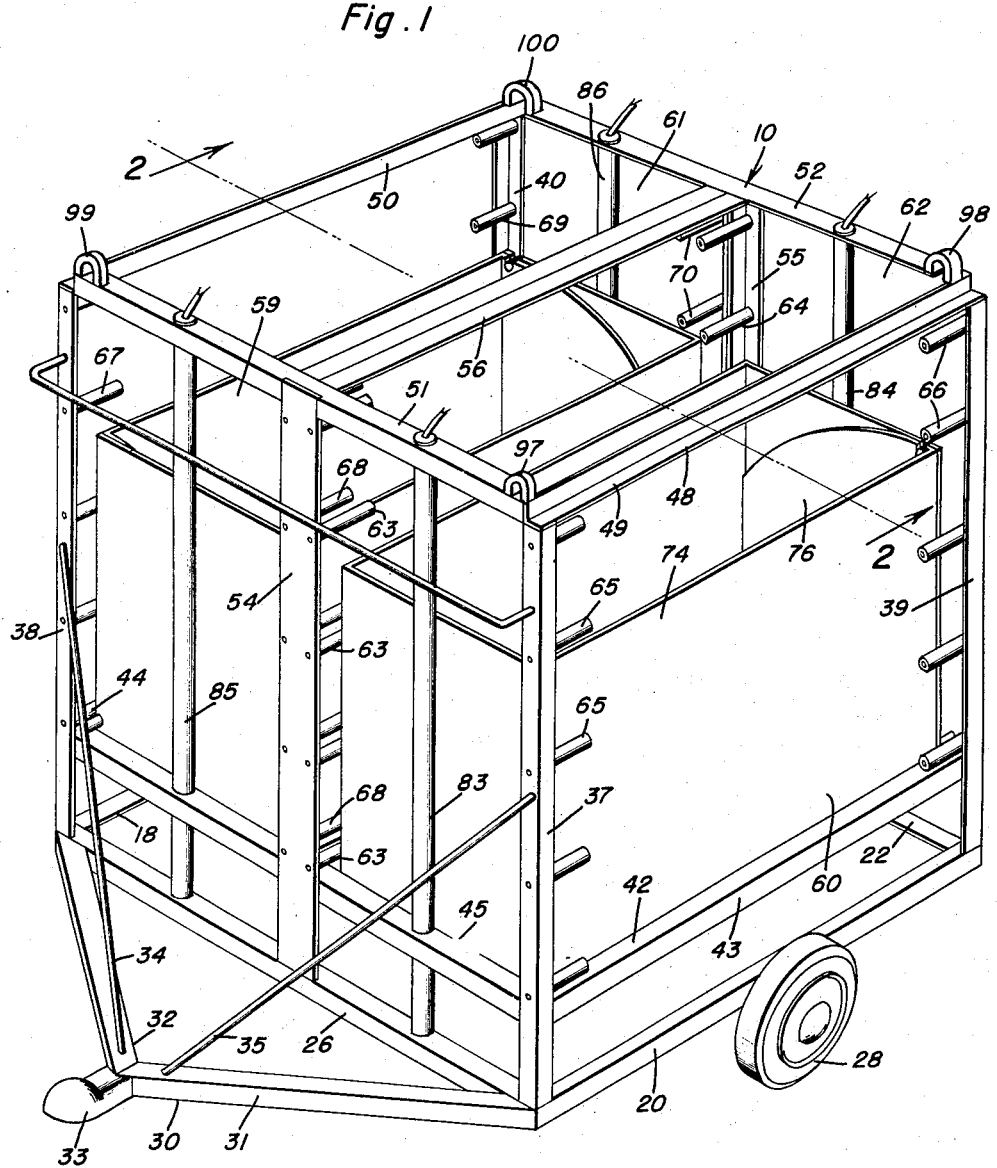

Feb. 9, 1960   C. C. MOORE   2,924,344
HARVESTING WAGON
Filed Feb. 12, 1957   4 Sheets-Sheet 3

Collins C. Moore
INVENTOR.

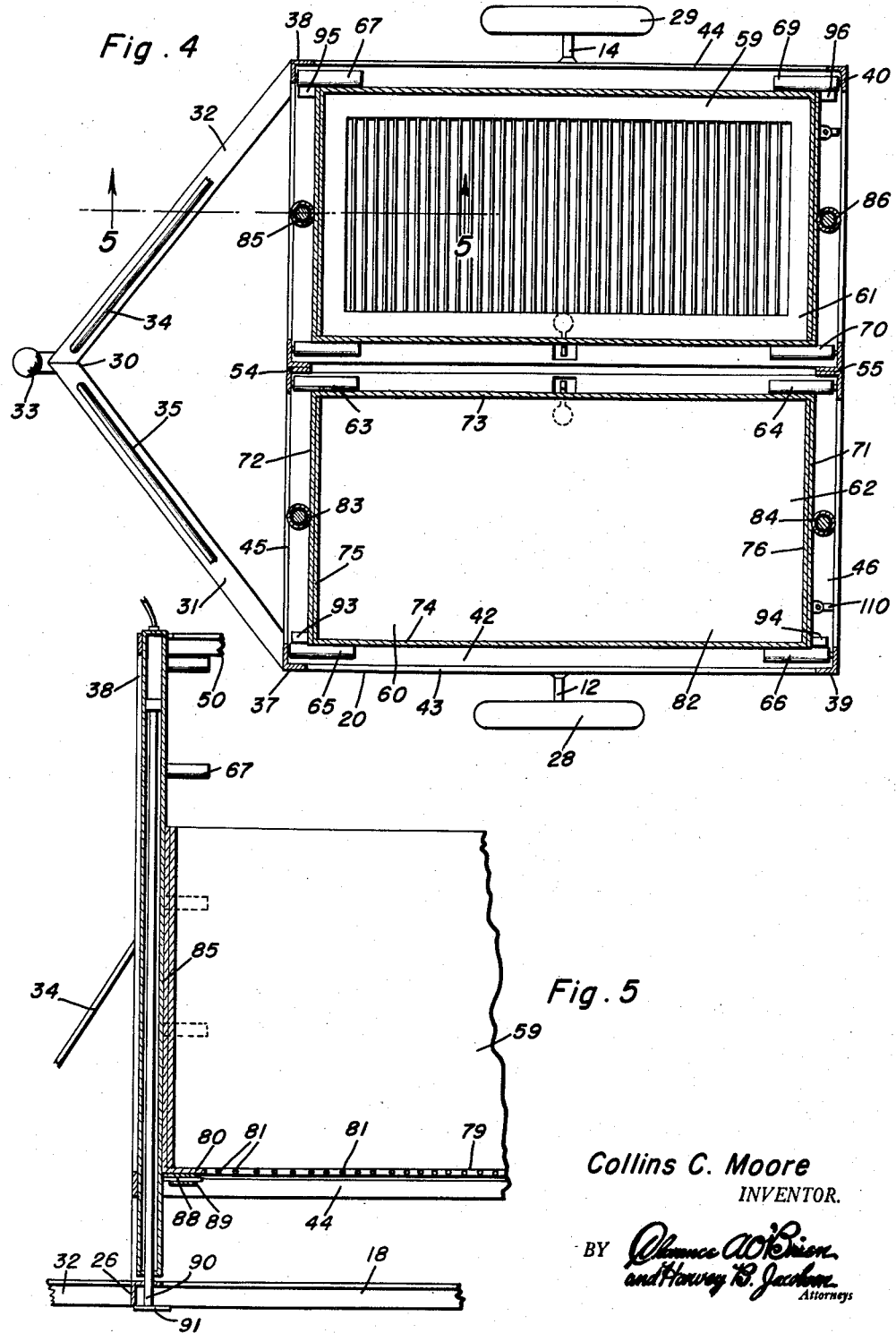

United States Patent Office 2,924,344
Patented Feb. 9, 1960

2,924,344

HARVESTING WAGON

Collins C. Moore, Garden City, Kans.

Application February 12, 1957, Serial No. 639,796

2 Claims. (Cl. 214—75)

This invention relates to wheeled vehicles and more particularly to a harvesting wagon or cart designed principally for harvesting sugar beets and sugar beet tops and may be attached to any tractor with a ball joint or other type of hitch.

An object of the invention is to provide a wagon or cart which is adapted to be drawn in operative relationship to a beet top picker of a beet harvester with the beet tops or ensilage adapted to be deposited in receptacles of the wagon, and due to the construction of the wagon, the ensilage or beet tops are easily dumped.

A more specific object of the invention is to provide a specially constructed cart that has two substantially identical compartments, there being in each compartment a receptacle adapted to receive beet tops, ensilage, etc., and arranged such that the receptacle is elevated when it is to be unloaded, one wall of the receptacle swinging downwardly to an unload position after the receptacle has been elevated a certain distance and then revolved pivotally about a substantially horizontal axis. One of the principal features of the invention is the manner in which the side wall opens, this being automatic in response to elevation of the receptacle or container beyond a predetermined elevated position at which latches are opened enabling the side wall to be gravity opened and the contents of the container spilled out into an awating chute, pile, elevator, etc.

I am aware of prior dump wagons which use screw jacks, sprockets, chains and other comparatively cumbersome mechanical parts which are slow moving. The invention is designed principally for the harvest of sugar beets and sugar beet tops; however, it is adaptable to the harvest of other forage crops. In order that sugar beets and sugar beet tops be understood in their correct valuation, the majority of domestic sugar production is from beets. The curent price per ton of beets is from $13.00 to $17.00. It is not too generally known that the crown or top of the sugar beet is low purity and, as a consequence, is discarded along with the leaf growth, these two items being generally referred to as the beet tops although they are not used in the manufacture of sugar. Their value as cattle and sheet rations is from forty to eighty percent as much as the sugar beet itself. Accordingly, it is a further object of the invention to provide a cart making it practical to harvest this second crop from a beet field, that is, the tops and crowns of the beets; that is, make it possible to handle them economically. The wagon or cart designed to serve this purpose is adapted to be connected to the tractor which pulls the beet harvester and to utilize the tractor power hydraulic system for operating very quickly and smoothly and positively actuating hydraulic cylinders. These lift and permit the receptacles to be lowered positively and rapidly. As a consequence, the crowns and tops of the beets may be thrown into the containers which have foraminous bottoms, until approximately a ton of such crop is in each container, and then the containers are easily unloaded by application of fluid under pressure to the hydraulic cylinders. This elevates the containers and at the same time automatically unlatches them when the proper elevation is reached so that the contents of the containers are emptied into a truck or into some other place as desired by the tractor operator. Although mention was made of a ton per container, it is understood that the cart may be made in any size and of any capacity within practical limits.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a wagon or cart which is constructed in accordance with the invention;

Figure 2 is a sectional view taken on the line 2—2 of Figure 1;

Figure 4 is a horizontal, sectional view taken on the line 4—4 of Figure 2;

Figure 5 is a fragmentary, sectional view taken on the line 5—5 of Figure 4;

Figure 7 is a fragmentary, elevational view showing principally the means for latching and unlatching the door which is made of a side wall of one of the containers or receptacles when the latter is in the full elevated position as shown in Figure 3; and Figure 8 is a fragmentary, elevational view taken approximately on the line 8—8 of Figure 7.

Figures 3, 6:
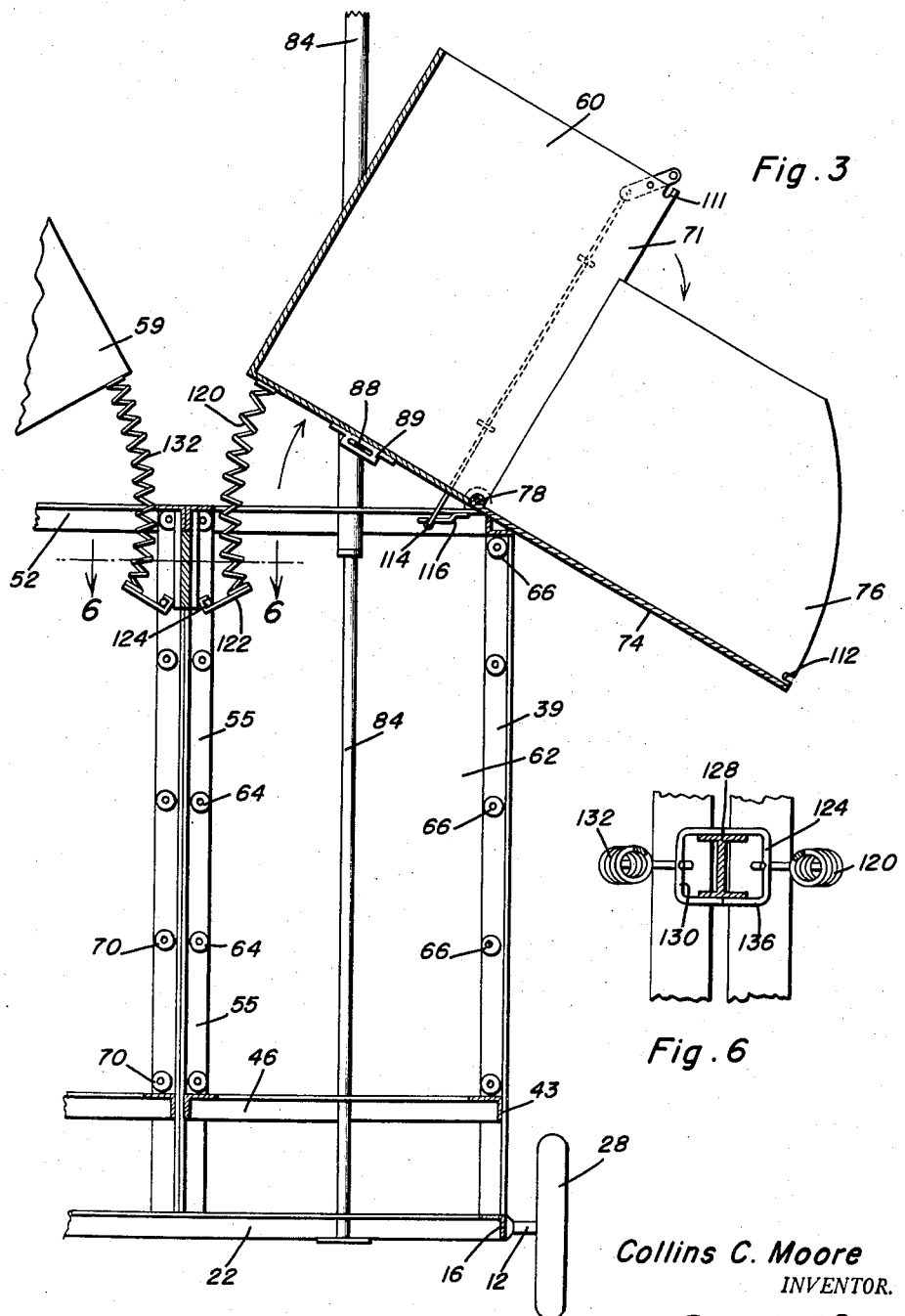
Figure 3 is an enlarged, fragmentary, sectional view showing the cart in the unloading position.
Figure 6 is a fragmentary, sectional view taken on the line 6—6 of Figure 3.

In the accompanying drawings, there is a cart or wagon 10 which is constructed to demonstrate the principles of the invention. This cart or wagon has a pair of axles 12 and 14 which protrude laterally from the sides 16 and 18 of the chassis 20. The chassis has rear member 22 and front member 26 attached to the sides 16 and 18, thereby providing a polygonal base. Wheels 28 and 29 are mounted for rotation on the axles 12 and 14. Tongue 30 is made of stout angulated members 31 and 32 which converge as they extend forwardly of the front member 26. The apex part of the tongue 30 has a part 33 of a trailer hitch, the other part being on the tractor which is used to draw the cart through the beet field. Braces 34 and 35 rise upwardly, outwardly and rearwardly from the apex part of the tongue 30 and are attached to the two uprights 37 and 38 of the frame of the cart. There are uprights 39 and 40 at the two rear corners of the chassis, all uprights being parallel to each other and being made preferably of angle-iron stock. A horizontal intermediate frame 42 is attached to the four uprights near the chassis. The intermediate frame 42 has side frame members 43 and 44 that are parallel and are located immediately above the sides 16 and 18 of the chassis. The intermediate frame has also front and rear frame members 45 and 46 located parallel to and immediately above the front frame member 26 and the rear frame member 22 of the frame 20. An upper polygonal frame 48 is made of parallel sides 49 and 50 above sides 42 and 44 of the intermediate frame, together with front member 51 and rear member 52 which is located above the front and rear members 45 and 46 respectively of the intermediate frame 42. Front and rear intermediate uprights, preferably of T-shaped section and seen at 54 and 55, are built up from angles and a flat plate or constructed by some other manner depending on the availability and cost of materials. The intermediate uprights 54 and 55 are connected with each of the three parallel frames that make up the chassis, the intermediate frame and the upper frame 48.

Transverse upper brace 56 is welded or otherwise secured to the intermediate uprights 54 and 55 and also the front and rear members 51 and 52 of the upper frame 48. This forms a strong cart skeleton in which to accommodate the two containers or receptacles 59 and 60 which are located in the two compartments that are separated by the intermediate uprights 55 and 54. Compartment 61 has container 59, while compartment 62 has container 60. The compartment 62 has four sets 63, 64, 65 and 66 of rollers that protrude inwardly from the four uprights 37, 39, 54 and 55 at the corners of compartment 62. Compartment 61 has four sets 67, 68, 69 and 70 of rollers protruding inwardly from the four corner uprights 38, 40, 55 and 54 of compartment 61. Container 60 is constructed of two side walls 71 and 72, a rear wall 73 and a front wall 74. The front wall has plates 75 and 76 parallel to each other and parallel to the side walls 71 and 72 and movable within the confines thereof. Hinge 78 at the lower front corner defined by front wall 74 and the front edge of the bottom 79 enables the wall 74 to function as a door when swung open (Figure 3). It is preferred that the bottom wall 79 of the receptacle be made of an approximately rectangular frame 80 with a plurality of parallel bars 81 extending thereacross. As an optional feature, a plate 82 (Figure 4) may be placed on the bars 81 when it is desired to prevent the escape of any of the fines through the spaces between the bars. However, the bars 81 will act as a grate so as to sift the soil from the beet tops and crowns, and this function will be accomplished automatically when they are thrown or otherwise deposited in the receptacle 60.

Each of the rollers in the compartment 62 and also in the compartment 61 are made of rolling stock connected to a fixed spindle, the spindle being carried by the various uprights as described previously. The rollers function to constrain the container 60 and the container 59 to vertical travel until a certain maximum elevation is reached (see Figure 3), at which time further operations take place.

There are two fluid motors, as hydraulic cylinders 83 and 84, attached to the front and rear members 26 and 22 respectively of the chassis and passed through holes in the intermediate frame and also in the upper frame. Identical front and rear drive connections interconnect the cylinders with the container 60 and the cylinders 85 and 86 with the container 59. With construction reference is made first to Figure 5 where cylinder 85 is shown as having a lateral finger 88 attached thereto and passed through a slot in depending bracket 89, the latter being welded or otherwise secured to the bottom of the container. The piston rod 90 is fixed, as by being welded to plate 91, on the chassis front frame member 26. It is intended that the hydraulic cylinder 85 be operatively connected with the hydraulic power system of the tractor, and therefore when fluid is applied in the cylinder the cylinder part thereof will be elevated, thereby vertically lifting the container with which it is connected. Hydraulic cylinders 85 and 86 will receive fluid under pressure simultaneously, and the same holds true for the hydraulic cylinders 83 and 84 that are connected to container 60. When the hydraulic cylinders elevate the container sufficiently, stops at the lower edge thereof engage with stops on the upper frame 48 and retain the front edge of the receptacle while the hydraulic cylinders continue to move the container vertically. More particularly, there is a pair of stops 93 and 94 on container 60 and stops 95 and 96 on container 59. A pair of stops 97 and 98 are formed in the front and rear members of the upper frame 48 and there is a similar pair of stops 99 and 100 for the stops 95 and 96 of the receptacle 59. The stops in frame 48 are downwardly opening, generally U-shaped, while the stops on the containers are in the form of small shanks. Therefore, as the container 60 is elevated (Figure 3), the stops 93 and 94 are received in the generally U-shaped, downwardly opening stops 97 and 98, and since the hydraulic cylinders 83 and 84 continue to move upwardly, the receptacle or container 60 pivots slightly.

And, at the same time that this takes place or substantially the same time that this takes place, the door 74 of the container 60 is unlatched, the latch mechanism being automatically closed. As shown in Figure 7, the latch mechanism comprises a push rod 102 slidable in bearings 103 and 104 on the side wall 71 of the container 60. Spring 106 is attached to the push rod 102 and rests on the bearing 104. The spring actuates the push rod 102 so that the locking lever 108 pivoted as at 109 to the side wall 71 of container 60 has its pin 110 fitted in notches 111 and 112 respectively, one notch being in side wall 71 and the other being in the plate 76 that has been described previously as attached to the door 74. This enables the door to remain latched until the pin 110 is separated from the pair of notches 111 and 112. An operating arm 114 is arranged at right angles at the lower extremity of the push rod 102 and engages under an arm 116 that is fixed to the rear member 52 of the upper frame 48. Therefore, as the receptacle 60 is elevated, not only does it swing pivotally as shown in Figure 3, but also the arm 114 engages with the arm 116 and through the action of the push rod 102 causes a subsequent separation of pin 110 from the aligned notches 111 and 112. Gravity lowering and forcing of the door 74 to the open position (due to the weight of the contents of the container) follows.

Finally, a further simultaneous operation is the stretching of spring 120 which is secured to the bottom of the container to function as a return for the container. The spring has a hook 122 at its end which is engageable with the pin 124 carried by intermediate upright 55 near the top thereof. As the movement of the container in an upward direction exceeds a particular place, the hook 122 engages with the pin 124 and the spring is then stretched for the remainder of the upward movement of the receptacle. Therefore, when the hydraulic fluid under pressure is released from the cylinders 84 and 83, the spring 120 pulls the receptacle to a returning position within its compartment 62 so that it may be gravity lowered. At the same time, the wall 74, which functions as a door, automatically returns to the closed and latched position by being squeezed into the proper place as the receptacle 60 is pulled either by gravity or by positive application of a force into a lowered position within the compartment 62. As shown in Figure 6, the pin 124 has a companion part 130 for the spring 132, the latter being attached to the receptacle 59. Accordingly, the pin may be formed of a loop 136 and secured to a mounting bracket 138 carried by the upright 55.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A harvesting wagon comprising a wheel supported frame forming an open top compartment, a receptacle vertically slidably mounted in said compartment for raising and lowering out of and into said top and having a bottom, hydraulic means for raising said receptacle and permitting gravitational lowering thereof, pivot means operatively connecting said hydraulic means to said receptacle and on which said receptacle is tiltable from and into upright position, stop means on said frame and receptacle coacting in response to raising of the receptacle to cause said receptacle to tilt from normal position, a side door hinged to said bottom of the receptacle for opening by gravity from a closed position in response to tilting of the receptacle from normal position, means on said frame wipingly engaing said door to close the same in response to lowering of said receptacle, tension springs on said bottom raised by said receptacle, and means on said springs and frame coupling the springs to the frame in response to raising of said springs for tensioning the receptacle to tilt said receptacle into upright position.

2. The combination of claim 1, said last named means comprising hooks on said springs engageable with said frame.

References Cited in the file of this patent

UNITED STATES PATENTS

| | | |
|---|---|---|
| 539,770 | Hawkins | May 21, 1895 |
| 567,100 | Hoy | Sept. 1, 1896 |
| 1,079,780 | Longest | Nov. 25, 1913 |
| 1,430,655 | Irrgang | Oct. 3, 1922 |
| 2,592,324 | Oliver | Apr. 8, 1952 |